(12) United States Patent
Ohashi

(10) Patent No.: US 12,732,009 B2
(45) Date of Patent: Sep. 8, 2026

(54) POWER SUPPLY DEVICE

(71) Applicant: Panasonic Energy Co.,Ltd., Osaka (JP)

(72) Inventor: Osamu Ohashi, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 631 days.

(21) Appl. No.: 18/262,567

(22) PCT Filed: Jan. 20, 2022

(86) PCT No.: PCT/JP2022/001889

§ 371 (c)(1),
(2) Date: Jul. 22, 2023

(87) PCT Pub. No.: WO2022/163475

PCT Pub. Date: Aug. 4, 2022

(65) Prior Publication Data

US 2024/0079891 A1 Mar. 7, 2024

(30) Foreign Application Priority Data

Jan. 27, 2021 (JP) ................................ 2021-011503

(51) Int. Cl.
*H02J 7/80* (2026.01)
*H02J 7/06* (2006.01)
*H02J 7/50* (2026.01)

(52) U.S. Cl.
CPC *H02J 7/80* (2026.01); *H02J 7/06* (2013.01); *H02J 7/50* (2026.01)

(58) Field of Classification Search
CPC .................. H02J 7/80; H02J 7/50; H02J 7/06
(Continued)

(56) References Cited

U.S. PATENT DOCUMENTS 10,263,433 B2 * 4/2019 Onizuka ............ H02M 3/1582
11,101,684 B2 * 8/2021 Liu ........................ H02M 1/36
(Continued)

FOREIGN PATENT DOCUMENTS

WO 2006/059511 6/2006

OTHER PUBLICATIONS

International Search Report of PCT application No. PCT/JP2022/001889 dated Mar. 1, 2022.

*Primary Examiner* — Daniel A Hess
(74) *Attorney, Agent, or Firm* — WHDA, LLP

(57) ABSTRACT

A microcomputer and a detection circuit in a low power consumption mode is restarted easily and stably. A power supply device includes a battery module (10) including battery cells (1), a battery connection circuit (2) configured to detect battery information of the battery module (10) and configured to be switched to a low power consumption mode, an activation circuit (3) configured to switch the battery connection circuit (2) from the low power consumption mode to an operation mode, and an activation switch (4) configured to output a switching signal to the activation circuit (3). The battery connection circuit (2) includes a detection circuit (21) configured to detect the battery information and a microcomputer (22) configured to process the battery information detected by the detection circuit (21). The activation circuit (3) includes a first switching circuit (6A) configured to output a first activation pulse to the detection circuit (21) in response to the switching signal input from the activation switch (4), and a second switching circuit (6B) configured to output a second activation pulse having a larger pulse width than the first activation pulse to the microcomputer (22) in response to the switching signal input from the activation switch (4).

18 Claims, 2 Drawing Sheets

(58) Field of Classification Search
USPC .......................................................... 320/137
See application file for complete search history.

(56) References Cited

U.S. PATENT DOCUMENTS

| | | | | |
|---|---|---|---|---|
| 2007/0273329 | A1 | 11/2007 | Kobuse et al. | |
| 2018/0313902 | A1* | 11/2018 | Nagasue .............. | G01R 31/396 |

* cited by examiner

FIG. 1

4
53
56
57
5
7
3
12
13
15
14
8
18
19
6
6A
16
16
33
6B
9
32
26
31
22
Micro-Computer
24
23
25
21
2
VBAT
Low-Voltage Power Supply
Microcomputer Power Supply
VDD50
AFE
VPC
10
1
1

POWER SUPPLY DEVICE

TECHNICAL FIELD

The present invention relates to a power supply device including a battery module including battery cells, and particularly to a power supply device including a battery connection circuit switchable to a low power consumption state connected to the battery module.

BACKGROUND ART

A power supply device including battery cells connected in series or in parallel is connected to a battery connection circuit so as to detect a state of the battery cells and to control a charging current and a discharging current. In the battery connection circuit, a detection circuit detects a voltage, a temperature, and a current of each battery cell constituting the battery module, and a microcomputer processing a detected signal. In order to prevent the battery cell from being over-discharged, the power supply device is switched to a low power consumption mode in which the power consumption of the battery connection circuit is reduced as much as possible when the device is not used, for example, is in a shutdown state. The power supply device includes an activation circuit that activates the detection circuit and the microcomputer of the battery connection circuit in the low power consumption mode, and switches the detection circuit and the microcomputer to an operation mode.

For example, as disclosed in PTL 1, the activation circuit may have a circuit configuration in which an activation pulse is output by pressing a push button of a manual operation switch. However, the activation circuit of the circuit configuration has a disadvantage that the detection circuit and the microcomputer of the battery connection circuit cannot be both stably and reliably activated if an activation pulse time is short. This is because of a time delay until the microcomputer that is shut down and in the low power consumption mode is activated and in a state where input of the activation pulse can be detected, that is, the microcomputer is in a polling state and in a state where a signal from an input terminal can be detected. This problem can be solved by a user continuously pressing an activation switch for a time longer than a predetermined time. However, not all the users necessarily press the activation switch in this state, and thus the detection circuit and the microcomputer cannot always be normally reactivated.

CITATION LIST

Patent Literature

PTL 1: Domestic Re-publication of PCT Patent Application No. 2006/059511

SUMMARY

The present invention solves the above problem. An important object of the invention is to provide a power supply device by which all users can reactivate a detection circuit and a microcomputer in a low power consumption mode simply, easily, and stably.

A power supply device according to an aspect of the invention includes: a battery module including chargeable battery cells, a battery connection circuit connected to the battery module and configured to detect battery information and being switchable to a low power consumption mode, an activation circuit configured to output an activation pulse switching the battery connection circuit from the low power consumption mode to an operation mode, and an activation switch configured to output a switching signal to the activation circuit. The battery connection circuit includes a detection circuit configured to detect the battery information of the battery module, and a microcomputer configured to process the battery information detected by the detection circuit. The activation circuit includes a first switching circuit configured to output a first activation pulse to the detection circuit in response to the switching signal input from the activation switch, and a second switching circuit configured to output a second activation pulse having a larger pulse width than the first activation pulse to the microcomputer in response to the switching signal input from the activation switch.

The power supply device according to the invention provides an advantageous effect that all users can reactivate the detection circuit and the microcomputer in the low power consumption mode simply, easily, and stably.

BRIEF DESCRIPTION OF DRAWINGS

FIG. 1 is a circuit diagram of a power supply device according to an embodiment of the invention.

DESCRIPTION OF EMBODIMENTS

Figure 2:
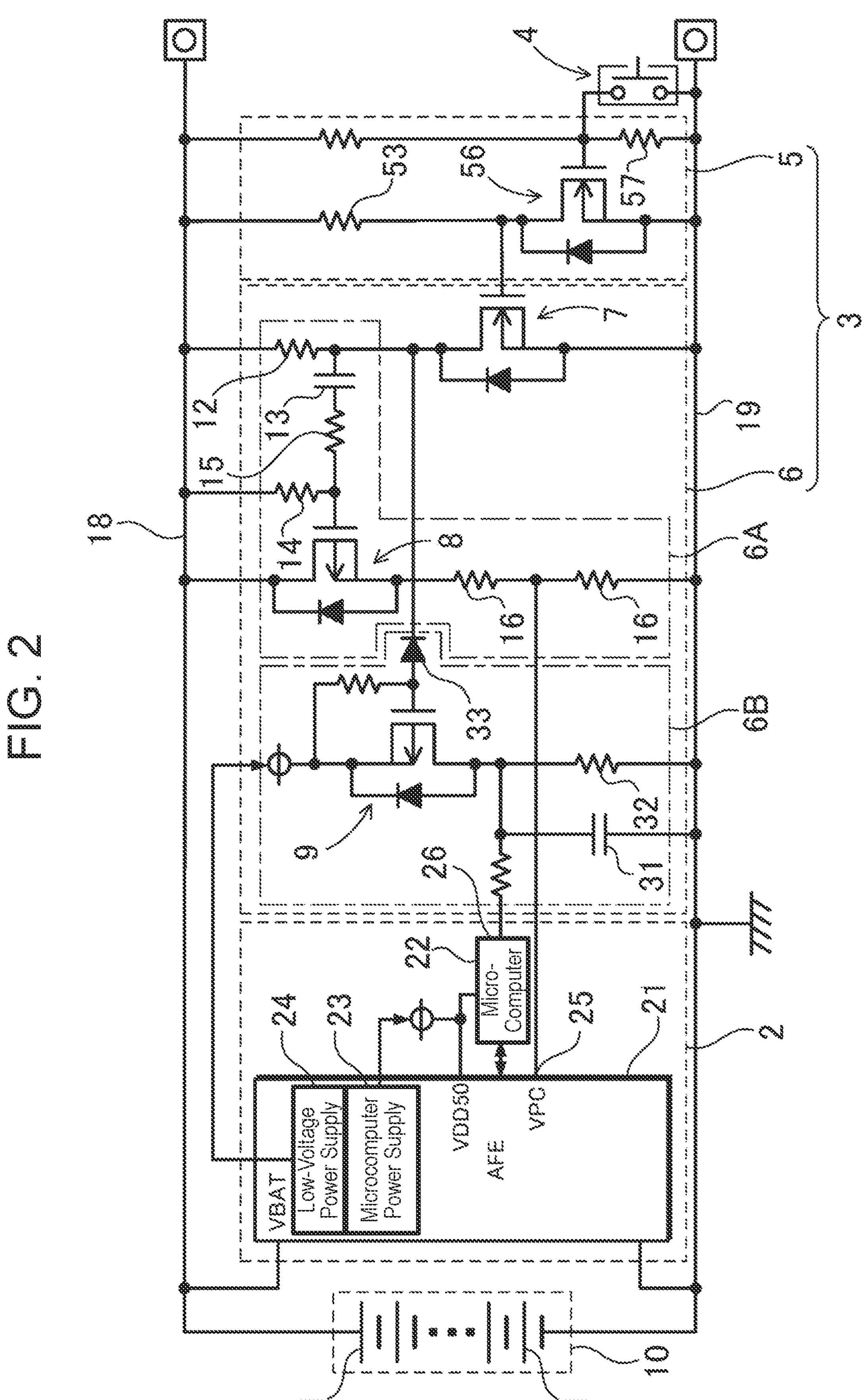
FIG. 2 is a circuit diagram of a power supply device according to another embodiment of the invention.

A power supply device according to a first aspect of the invention includes: a battery module including chargeable battery cells, a battery connection circuit connected to the battery module and configured to detect battery information and to be switchable to a low power consumption mode to reduce consumed power of the battery module while being unused, an activation circuit configured to output an activation pulse switching the battery connection circuit from the low power consumption mode to an operation mode, and an activation switch configured to output a switching signal to the activation circuit. The battery connection circuit includes a detection circuit configured to detect the battery information, such as a voltage, a current, and a temperature, of the battery module, and a microcomputer configured to process the battery information detected by the detection circuit. The activation circuit includes a first switching circuit configured to output a first activation pulse to the detection circuit in response to the switching signal input from the activation switch, and a second switching circuit configured to output a second activation pulse having a larger pulse width than the first activation pulse to the microcomputer in response to the switching signal input from the activation switch.

In the power supply device described above, the first switching circuit of the activation circuit outputs the first activation pulse to the detection circuit and sets the activation circuit in the low power consumption mode to the operation mode, and the second switching circuit outputs the second activation pulse having a larger pulse width than the first activation pulse to the microcomputer and switches the microcomputer to the operation mode. Even in a state where a user presses the activation switch only for an extremely short time, this configuration allows both the detection circuit and the microcomputer to be reliably set to the operation mode and normally activated. This configuration switches both the detection circuit and the microcomputer to the operation mode without being affected by the pressing time of the activation switch. Therefore, all users can switch both the detection circuit and the microcomputer from the low power consumption mode to the operation mode simply, easily, and stably by pressing the activation switch.

In a power supply device according to a second aspect of the invention, the detection circuit includes a first input terminal configured to have the first activation pulse input thereto. The microcomputer includes a second input terminal configured to have the second activation pulse input thereto. The detection circuit is configured to detect the first activation pulse and supply a power supply voltage to the microcomputer to set the microcomputer to a polling state. The microcomputer in the polling state is configured to detect the second activation pulse and determine switching from the low power consumption mode to the operation mode.

The power supply device described above has as advantageous effect that the microcomputer can reliably switch to the operation mode by detecting the second activation pulse input to the second input terminal during use while reducing power consumption in an unused state by switching the microcomputer to the low power consumption mode.

A power supply device according to a third aspect of the invention, the activation circuit includes an input circuit configured to output a High signal while the activation switch is turned on, and an output circuit connected to an output side of the input circuit. The output circuit includes a first switching circuit configured to output the first activation pulse, and a second switching circuit configured to output the second activation pulse.

In the power supply device described above, the switching signal from the activation switch is converted into a High or Low signal by the input circuit, the first switching circuit and the second switching circuit output the activation pulses to the input terminals of the detection circuit and the microcomputer, and the detection circuit and the microcomputer in the low power consumption mode can be switched to the operation mode.

A power supply device according to a fourth aspect of the invention, the detection circuit includes a first input terminal configured to have the first activation pulse input thereto. The microcomputer includes a second input terminal configured to have the second activation pulse input thereto. The first switching circuit includes a first FET configured to output the High signal from the input circuit to the first input terminal of the detection circuit. The second switching circuit includes a second FET configured to output the High signal from the input circuit to the second input terminal of the microcomputer. A parallel circuit of a capacitor and a resistor is connected between a ground line and an output side of the second FET.

The power supply device described above has an advantageous effect that a simple circuit configuration including a parallel circuit of a capacitor and a resistor connected to the output side of the input FET stably and reliably switches the microcomputer from the low power consumption mode to the operation mode by outputting a second activation pulse having a larger pulse width to the second input terminal while the first FET and the second FET stably outputs the High signal input from the input circuit to the detection circuit and the microcomputer.

A power supply device according to a fifth aspect of the invention, the first switching circuit includes a first FET configured to output the High signal from the input circuit to the first input terminal of the detection circuit. The second switching circuit includes a second FET configured to output the High signal from the input circuit to the second input terminal of the microcomputer. The first FET is powered by a voltage of the battery module. The first FET includes a coupling capacitor connected in series with a gate thereof.

The power supply device described above has an advantageous effect that power consumption of the first FET in the on state of the activation switch can be reduced. This is because the coupling capacitor cuts a direct current component and inputs only an alternating current component from the input circuit to the gate of the first FET to prevent the first FET from being continuously turned on. Therefore, even if the user continuously turns on the activation switch for a long time, the first FET is not continuously turned on. The circuit configuration in which the first FET is powered by the voltage of the battery module has a simple circuit configuration by supplying power to the first FET without a DC/DC converter or the like stepping down the voltage of the battery module. However, the power supply voltage of the first FET and the power consumption increase. The circuit configuration in which only the alternating current component is input to the gate of the first FET via the coupling capacitor and the on time can be shortened reduces the power consumption of the first FET having a high power supply voltage.

A power supply device according to a sixth aspect of the invention further includes a diode connected in series to a gate of the second FET.

The battery module described above has an advantageous effect that the High signal from the input circuit can be accurately input to the gate of the second. FET and the second activation pulse can be output from the second FET to the microcomputer.

In a power supply device according to a seventh aspect of the invention, the detection circuit includes a low voltage power supply configured to step down the voltage of the battery module and supply the power supply voltage to the second FET.

The power supply device described above has an advantageous effect to reduce the power consumption of the second FET which outputs the second activation pulse having a lager pulse width. This is because the power supply voltage of the second FET is lower than the voltage of the battery module. The second FET is turned on at a timing of outputting the second activation pulse to the microcomputer, thereby charging the capacitor connected to the output side to a high voltage. The power supply voltage of the second FET lower than the voltage of the battery module may be determined to be an optimum voltage for the high voltage, similar to the first FET, no circuit is required for dividing the voltage of the battery module to generate an activation pulse having a predetermined voltage. The first FET can be turned on for a short time to output the first activation pulse to the activation circuit, but the second FET allows a charging current of the capacitor to flow through and outputs the second activation pulse having a large pulse width. Therefore, a current between the drain and the source while the FET turned on is large, and power loss increases in a circuit configuration in which the activation pulse is output with the voltage being divided by resistors.

In a power supply device according to an eighth aspect of the invention, the detection circuit is configured to, upon detecting the first activation pulse, set the low voltage power supply to the operation mode, and supply the power supply voltage to the second FET.

In a power supply device according to a ninth aspect of the invention, the detection circuit includes a microcomputer power supply configured to step down a voltage of the battery module and supply a power supply voltage to the microcomputer. The power supply device described above can supply the power supply voltage from the detection circuit to the microcomputer.

In the power supply device according to a tenth aspect of the invention, the detection circuit is configured to, upon detecting the first activation pulse, set the microcomputer power supply to the operation mode, and supply the power supply voltage to the microcomputer.

The power supply device described above has an advantageous effect to reduce the power consumption in the unused state by setting the microcomputer power supply for supplying the power supply voltage to the microcomputer to the low power consumption mode, and to reduce the power consumption of the microcomputer when the activation switch is pressed to set the detection circuit to the operation mode since the power supply voltage can be supplied from the microcomputer power supply to the microcomputer.

In a power supply device according to an eleventh aspect of the invention, the detection circuit includes a low voltage power supply configured to step down the voltage of the battery module and supply the power supply voltage to the second FET. The microcomputer power supply together with the low voltage power supply supplies the power supply voltage to the microcomputer and the second FET.

In a power supply device according to a twelfth aspect of the invention, an output voltage of the battery module is 30 V or more, and an output voltage of the low voltage power supply is 5 V or less.

In a power supply device according to a thirteenth aspect of the invention, an output voltage of the battery module is 30 V or more, and an output voltage of the microcomputer power supply is 5 V or less.

In a power supply device according to a fourteenth aspect of the invention, the activation switch is a push-button switch configured to output an on signal while being pressed.

Hereinafter, the invention will be described in detail with reference to the drawings. In the following description, terms indicating specific directions and positions (for example, "up", "down", and other terms including the terms) are used as necessary, but the use of the terms is intended to facilitate understanding of the invention with reference to the drawings, and the technical scope of the invention is not limited by meanings of the terms. Parts of the same reference numerals appearing in a plurality of drawings indicate the same or equivalent parts or members.

Embodiments to be described later are specific examples of a technical idea of the invention, and the invention is not limited to the following embodiments. Dimensions, materials, shapes, relative arrangements, and the like of components to be described later are not intended to limit the scope of the invention only thereto and are intended to be exemplified unless otherwise specified. Contents described in one embodiment and one example can also be applied to other embodiments and examples. The size, positional relation, and the like of the members shown in the drawings may be exaggerated in order to clarify the description.

Power Supply Device 100

Figure 1:
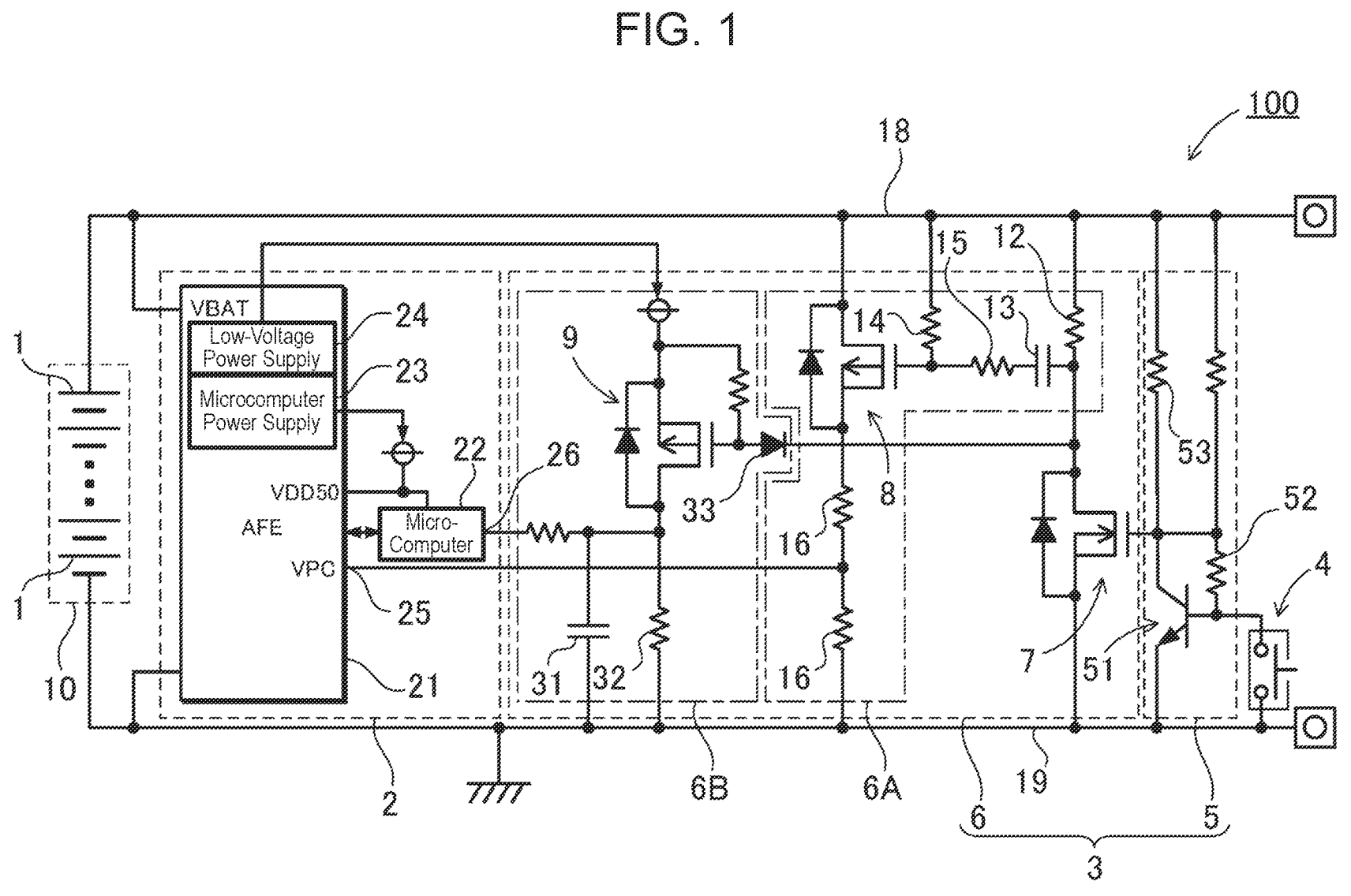

Power supply device 100 shown in FIG. 1 includes battery module 10 including chargeable battery cells 1 connected in series or in parallel to one another, battery connection circuit 2 connected to battery module 10 and configured to detect battery information and being switchable to a low power consumption mode reducing power consumption while being unused, activation circuit 3 configured to output an activation pulse switching battery connection circuit 2 from the low power consumption mode to an operation mode, and activation switch 4 configured to output a switching signal to activation circuit 3. Battery connection circuit 2 includes detection circuit 21 configured to detect the battery information, such as a cell voltage, of battery module 10, and microcomputer 22 configured to process the battery information detected by detection circuit 21. Activation circuit 3 includes first switching circuit 6A configured to output a first activation pulse to detection circuit 21 in response to the switching signal input from activation switch 4, and second switching circuit 6B configured to output a second activation pulse having a larger pulse width than the first activation pulse to microcomputer 22 in response to the switching signal input from the activation switch 4 to set microcomputer 22 to the operation state.

Battery Module 10

In battery module 10, battery cells 1 are connected in series or in parallel to one another, or in series and in parallel to increase a rechargeable capacity. Battery module 10 has an optimum voltage and rechargeable capacity for use of power supply device 100 depending on the number of battery cells 1 connected in series or in parallel to one another. Power supply device 100 is used in various use, for example, a power storage device or a power supply device for traveling a vehicle. A power supply device used in the power storage device has an output voltage of battery module 10 of, for example, 40 V to 100 V, and the power supply device for traveling a vehicle has the output voltage of battery module 10 of 200 V to 400 V. Battery cells 1 are preferably non-aqueous electrolyte secondary batteries such as lithium-ion secondary batteries or lithium polymer secondary batteries, whose rechargeable capacity can be increased with respect to weight and capacity. However, the invention does not specify the battery cells, and all other chargeable secondary batteries that are currently used or developed therefrom, for example, all individual batteries, can be used.

Detection Circuit 21 and Microcomputer 22

Detection circuit 21 detects a state of battery module 10, that is, detects battery information. Microcomputer 22 processes the battery information input from detection circuit 21. The battery information detected by detection circuit 21 is, for example, a voltage or temperature of battery cells 1 constituting battery module 10, a current of battery module 10, or the like. Detection circuit 21 detects the battery information as an analog signal. Detection circuit 21 converts the detected analog signal into a digital signal, and outputs the digital signal to an external control circuit (not shown). Power supply device 100 including battery connection circuit 2 configured to detect the voltage and the temperature of battery cells 1 and further detect the current of battery module 10 outputs the battery information to the external control circuit. The external control circuit controls charging or discharging of battery module 10. Power supply device 100 charges and discharges battery module 10 while preventing battery cells 1 from being overcharged or overdischarged. Power supply device 100 including detection circuit 21 configured to detect the temperature of battery cells 1 has an advantageous effect that the temperature of battery cells 1 can be kept at a set temperature and safely charged or discharged. Power supply device 100 described above does not specify the battery information detected by battery connection circuit 2 as the voltage, the temperature, and the current, and can detect, for example, a remaining capacity of each battery cell 1 as the battery information and output the battery information to the outside.

Detection circuit 21 that detects the voltage or the current includes a voltage detection circuit that detects the voltage of battery cells 1 constituting battery module 10, a temperature detection circuit that detects a temperature of specific battery cell 1, a current detection circuit that detects a charging or discharging current of battery module 10, and an A/D converter that converts analog signals detected by the detection circuits into digital signals (not shown). Power supply device 100 according to the invention does not specify the circuit configuration of detection circuit 21 of battery connection circuit 2, and may be a detection circuit that detects other parameters of battery module 10, for example.

Detection circuit 21 includes microcomputer power supply 23 configured to step down a voltage of battery module 10 and supply a power supply voltage to microcomputer 22. Detection circuit 21 detects that the first activation pulse is input from activation circuit 3, and activates microcomputer power supply 23. Detection circuit 21 activates microcomputer power supply 23 upon detecting the first activation pulse, but there is a time delay of, for example, about several hundred microseconds to several milliseconds from when the first activation pulse is input until the microcomputer power supply 23 outputs a normal power supply voltage to microcomputer 22. Therefore, microcomputer power supply 23 supplies the power supply voltage to microcomputer 22 after a predetermined time delay from the input of the first activation pulse to detection circuit 21. In the low power consumption mode, microcomputer power supply 23 does not supply the power supply voltage to microcomputer 22 while microcomputer power supply 23 is not in the operation mode.

Detection circuit 21 further includes low voltage power supply 24 that supplies a power supply voltage of second FET 9 of activation circuit 3, which will be described later. Low voltage power supply 24 does not supply the power supply voltage to second FET 9 in the low power consumption mode of detection circuit 21. Low voltage power supply 24 preferably supplies a power supply voltage to second FET 9 at a timing when the first activation pulse is input. Low voltage power supply 24 has a smaller supply power than microcomputer power supply 23, and can supply a low power supply voltage to second FET 9 with a small time delay from the first activation pulse. Detection circuit 21 including microcomputer power supply 23 and low voltage power supply 24 as separate power supplies is configured to supply the power supply voltage to second FET 9 with the small time delay of low voltage power supply 24, and supply optimum power supply voltages to both microcomputer 22 and second FET 9. Detection circuit 21 is configured to supply the power supply voltage to microcomputer 22 and second FET 9 from microcomputer power supply 23 together with low voltage power supply 24 or from low voltage power supply 24 together with microcomputer power supply 23.

Microcomputer power supply 23 and low voltage power supply 24 may be implemented by DC/DC converters that output the voltage of battery module 10 after stepping down the voltage. In the low power consumption mode of detection circuit 21, the DC/DC converters continuously turn off a semiconductor switching element to block the output voltage. Upon detecting the first activation pulse, both microcomputer power supply 23 and low voltage power supply 24 are set to the operation mode, and supply the power supply voltage to microcomputer 22 and second FET 9. The DC/DC converter of low voltage power supply 24 has a smaller supply power than microcomputer power supply 23 of second FET 9, for example, in order to increase a switching frequency of the DC/DC converter or to reduce a ripple of the output voltage. This configuration allows a capacitance of an electrolytic capacitor provided in a smoothing circuit to be reduced to reduce the time delay of activation.

Microcomputer 22 configured to process the digital signals input from detection circuit 21. The processing of microcomputer 22 may be comparing of the input detection voltage of battery cells 1 with a minimum voltage and a maximum voltage, and output a signal specifying a maximum charging or discharging current of battery module 10 to a main control circuit (not shown), or computing a remaining capacity of battery module 10 or battery cells 1 based on the voltage and the current of battery module 10 or battery cells 1 and output the remaining capacity to an external control circuit or display the remaining capacity of the battery by lighting an LED.

Detection circuit 21 and microcomputer 22 have a switching function of detecting a state of not being used for a set time, or detecting a signal from outside, and being switched to the low power consumption mode to reduce wasteful power consumption. In the low power consumption mode, microcomputer 22 is preferably shut down to reduce the power consumption. In the low power consumption mode, when the activation pulse is input from activation circuit 3, detection circuit 21 and microcomputer 22 are reactivated and return to the operation mode. Both detection circuit 21 and microcomputer 22 are set to the low power consumption mode to reduce the wasteful power consumption. Detection circuit 21 stops supplying the power supply voltage to start the low power consumption mode, and microcomputer 22 is preferably shutdown to be switched to the low power consumption mode. Microcomputer 22 can also reduce the power consumption by being set to a pause state or a sleep state, without necessarily being shut down. Therefore, in the present specification, the term "low power consumption mode" means all states where the power consumption is reduced as compared with a normal operation state, and is preferably the shutdown state, but not necessarily specified as the shutdown state, and is used meaning to include a mode of reducing the power consumption by being set to the pause state or the sleep state.

Microcomputer 22 generates a time delay less than about one second from when the first activation pulse is input from activation circuit 3 to detection circuit 21 until when becoming capable of polling plural input terminals and detecting an input signal, that is, to initial setting. Microcomputer 22 has, depending on a processing capability, different time delays from when the activation pulse is input until when starting the polling state, and as a specific example of the time delay of microcomputer 22 used for this type of application, for example, a total time delay of about 700 milliseconds occurs, including: about 1 milliseconds of the time delay from when the first activation pulse is input to detection circuit 21 until when microcomputer power supply 23 supplies the power supply voltage to microcomputer 22, about 70 milliseconds of reset cancellation, about 500 milliseconds of microcomputer booting, about 3 milliseconds of port switching, and about 130 milliseconds of port potential polling of 16 channels. Microcomputer 22 can be reactivated by inputting the second activation pulse having a pulse width of about one second.

Microcomputer 22 described above has a time delay of about 700 milliseconds from when activation switch 4 is pressed until when the signal from second input terminal 26 can be detected, that is, until when entering the polling state and becoming capable of detecting the second activation pulse, Therefore, microcomputer 22 can be reliably reactivated by receiving a second activation pulse whose pulse width is about one second, which is longer than the time delay, Since the time delay until microcomputer 22 becomes capable of polling and detecting the signal from second input terminal 26 depends on a processing speed, microcomputer 22 is reliably reactivated by setting the pulse width of the second activation pulse input to second input terminal 26 longer than the time delay, Activation Circuit 3

Activation circuit 3 reactivates battery connection circuit 2 from the low power consumption mode and switches to the operation mode in response to the switching signal input from activation switch 4. The activation circuit 3 includes input circuit 5 that outputs a High signal while activation switch 4 connected to an input side thereof, and output circuit 6 connected to an output side of input circuit 5. Output circuit 6 includes first switching circuit 6A configured to output the first activation pulse to detection circuit 21, and second switching circuit 6B configured to output the second activation pulse to microcomputer 22. In activation circuit 3 shown in FIG. 1, inverting FET 7 is connected to an input side of output circuit 6, and first switching circuit 6A and second switching circuit 6B are connected to an output side of inverting FET 7.

Activation switch 4 is a normally-off manual switch, a push-button switch that is turned on while a push button thereof is pressed. As activation switch 4, instead of the push-button switch, all other switches that can be turned on and off by being operated by a user, for example, a proximity switch can be used.

Input circuit 5 includes input transistor 51 having a base connected to ground line 19 via activation switch 4. Input transistor 51 is a bipolar transistor, and has a base connected to ground line 19 via activation switch 4 and connected to a collector thereof via base resistor 52. The collector is connected to a positive side of power supply line 18 that is a positive side of battery module 10 via first load resistor 53. The base of input transistor 51 is connected to the collector and is turned on while activation switch 4 is turned off. When activation switch 4 is pressed and switched to be turned on, the base of the input transistor 51 is connected to an emitter thereof via ground line 19 to turn off the transistor.

Since the base of input transistor 51 is connected to the collector via base resistor 52, input circuit 5 shown in FIG. 1 allows a base current to flow via base resistor 52 and is continuously turned on while activation switch 4 is turned off. Activation switch 4 is a normally off switch. While the push button is not pressed, activation switch 4 is turned on-turned off and continuously turns on input transistor 51. Base resistor 52 has an electric resistor flowing the base current to turn on input transistor 51 while activation switch 4 is turned off.

In the bipolar transistor used for input transistor 51, the base current controls a collector current, and a product of the base current and a current gain is the collector current. The current gain of a general transistor is about 100 to 500. Therefore, input transistor 51 may have the base current set to 1/100 to 1/500 of the collector current. For example, input transistor 51 having the collector current of 50 μA to 1.00 μA and a current gain of 100 can have the base current set to 0.5 μA to 1 μA. Input transistor 51 can set the collector current to 50 μA as a resistance value whose base current is 0.5 μA.

Input transistor 51 reducing the base current to 1/100 to 1/500 of the collector current is effective for remarkably reducing power consumption of input circuit 5. This is because power consumed by input circuit 5 of activation circuit 3 can be remarkably reduced in the low power consumption mode of battery connection circuit 2. In activation circuit 3, first FET 8 and second FET 9 are connected to the output side of input circuit 5, but the FETs are continuously turned off and do not consume power in the low power consumption mode. Inverting FET 7 of input circuit 5 is also turned off and does not consume power while activation switch 4 is not pressed in the low power consumption mode. Since only input transistor 51 is thus turned on and consumes power while activation switch 4 is not pressed in the low power consumption mode, it is extremely important to reduce the power consumption of input transistor 51.

As shown in FIG. 2, in input circuit 5, the input transistor may be an ITT. In order to continuously turn on the FET, in input circuit 5, both a drain current flowing between a drain and a source of input FET 56 and an idle current flowing through gate resistor 57 connected to a gate of the FET flow through. Since the idle current is set to a current value comparable to the drain current in order to keep input FET 56 in a stable operation state, a consumption current of activation circuit 3 is about twice the drain current of input FET 56.

By setting the collector current of input transistor 51 to the same current value as that of the drain current of the FET shown in FIG. 2, activation circuit 3 shown in FIG. 1 can reduce the base current to a current value that is 1/100 to 1/500 of the collector current, which is almost negligible. In input FET 56 shown in FIG. 2, while activation switch 4 is turned off, both the idle current flowing through the gate resistor is substantially equal to the drain current, and activation circuit 3 consumes a current about twice the drain current of an input FET. Since activation circuit 3 shown in FIG. 1 extremely reduces the base current of input transistor 51 to 1/100 to 1/500 of the collector current, the consumption current of activation circuit 3 also can be reduced by 50% with respect to the input FET. In activation circuit 3, both the input FET and input transistor 51 are turned on and normally consume power while activation switch 4 is turned off, reduction of the power consumption can reduce the power consumption of power supply device 100 in the low power consumption mode, thereby reducing the wasteful power consumption of the battery in this mode.

Input transistor 51 has a collector connected to first load resistor 53. An electric resistance of first load resistor 53 is large to reduce the collector current of input transistor 51 while being turned on. This is because input transistor 51 turn on connects power supply line 18 to ground line 19 via first load resistor 53 to cause the collector current to flow through, and the collector current decreases inversely proportional to an electric resistance of first load resistor 53. When activation switch 4 is switched from being turned off to being turned on, a collector voltage of input transistor 51 is a high voltage obtained by being divided by the first load resistor 53 and the base resistor 52 of the input transistor 51. A High or Low signal output from the collector of input transistor 51 is input to output circuit 6.

Output Circuit 6

Output circuit 6 includes inverting FET 7 connected to an output side of input transistor 51, and first switching circuit 6A and second switching circuit 6B connected to the output side of inverting FET 7.

Inverting FET 7

Inverting FET 7 is an n-channel which inverts the High or Low signal input from input transistor 51 and outputs the inverted signal to first FET 8 and second FET 9. Inverting FET 7 has a gate connected to the collector of input transistor 51, a source connected to ground line 19, and a drain connected to power supply line 18 on the positive side of battery module 10 via second load resistor 12. While activation switch 4 is turned off, inverting FET 7 is continuously turned off by connecting the gate to ground line 19 by input transistor 51 which is turned on. While activation switch 4 is turned on, inverting FET 7 is turned on when a High signal is input to the gate, connects second load resistor 12 to ground line 19, and outputs a Low signal.

First Switching Circuit 6A

First switching circuit 6A includes first FET S configured to output, as the first activation pulse, the High signal input from inverting FET 7 to first input terminal 25 in detection circuit 21. The gate of first FET 8 is connected via coupling capacitor 13 to the drain that is the output side of inverting FET 7. When inverting FET 7 is switched from being turned off to being turned on, coupling capacitor 13 inputs a signal with which the drain voltage of inverting FET 7 rises from a Low voltage to a High voltage to the gate of first FET 8 as a trigger signal, thereby temporarily switching first FET 8 to turn on first FET 8. First FET 8 is switched to be turned on at only a timing when an on voltage is input from coupling capacitor 13. A time during which FET 8 is turned on by coupling capacitor 13 inputting the on voltage to first FET 8 can be determined by a capacitance of coupling capacitor 13 and an electric resistance of gate resistor 14. The on time of first FET 8 can increase by increasing the capacitance of coupling capacitor 13 and increasing the electric resistance of gate resistor 14. But since first FET 8 outputs the first activation pulse to detection circuit 21 while being turned on, the capacitance of coupling capacitor 13 and the electric resistance of gate resistor 14 are determined such that the pulse width of the first activation pulse is a predetermined time.

Coupling capacitor 13 is connected in series to coupling resistor 15, Coupling resistor 15 controls the drain current by adjusting the gate current when first FET 8 turned on. Since a product of the drain current of first FET S and the electric resistance of third load resistor 16 is a voltage value of the first activation pulse, a voltage of the first activation pulse is set to an optimum value by adjusting a division ratio of third load resistor 16 and the drain current of first FET 8.

Second Switching Circuit 6B

Second switching circuit 6B includes second FET 9 configured to output the second activation pulse having a predetermined pulse width to second input terminal 26 in microcomputer 22 by using, as a trigger pulse, a signal of raising to a high voltage that is input from inverting FET 7. In second FET 9, a parallel circuit including capacitor 31 and resistor 32 connected in parallel to each other is connected between ground line 19 and the drain that is the output side, and the pulse width of the second activation pulse output to microcomputer 22 is set to a predetermined time width.

Second FET 9 has a gate connected in series to diode 33. Diode 33 is connected in a direction along which a signal changing the drain of inverting FET 7 from a high voltage to a low voltage is input to the gate of second FET 9 as the trigger signal. P-channel second FET 9 in which a voltage of the gate decreases to a voltage of ground line 19 via diode 33 has a gate connected to a drain of inverting FET 7 via diode 33, and is switched to be turned on when a gate voltage is input. Second FET 9 switched to be turned on charges capacitor 31 connected between the drain and ground line 19 to keep the drain voltage in a high voltage. The voltage of capacitor 31 kept at the high voltage is output, as the second activation pulse, to second input terminal 26 provided in microcomputer 22 to activate microcomputer 22. Since the pulse width of the second activation pulse can be increased by increasing the capacitance of capacitor 31, for example, capacitor 31 is set to a capacitance at which the pulse width of the second activation pulse for activating microcomputer 22 is about 1 second. Since capacitor 31 is gradually discharged by resistor 32 connected to capacitor 31 in parallel, the pulse width of the second activation pulse can be increased by increasing an electric resistance of resistor 32. Therefore, the pulse width of the second activation pulse can be set to an optimum value by time constants of the capacitance of capacitor 31 and the electric resistance of resistor 32.

Second FET 9 supplies the voltage of battery module 10 from low voltage power supply 24, not directly supplying a voltage from battery module 10. A voltage of low voltage power supply 24 determines a voltage at which second FET 9 is turned on to charge capacitor 31. The voltage of capacitor 31 is set to a voltage gradually decreasing by resistor 32 and can output second input terminal 26 of microcomputer 22 as the activation pulse. Even when capacitor 31 is discharged and the voltage thereof gradually decreases, an output voltage of low voltage power supply 24, that is, a voltage between the drain and the source of the second FET 9 is kept, for a predetermined time, higher than a voltage allowing microcomputer 22 to recognize as the activation pulse of a high voltage. Therefore, a power supply voltage of low voltage power supply 24 is preferably set to several times the voltage recognized as a high voltage by microcomputer 22. The pulse width of the second activation pulse can be set based on the power supply voltage of low voltage power supply 24 which is an initial charging voltage of capacitor 31, the capacitance of capacitor 31, and the electric resistance of resistor 32. The pulse width of the second activation pulse can be increased by increasing the voltage of low voltage power supply 24, increasing the capacitance of capacitor 31, and increasing the electric resistance of resistor 32, and conversely, the pulse width of the second activation pulse can be decreased. Therefore, the voltage of low voltage power supply 24, the capacitance of capacitor 31, and the electric resistance of resistor 32 are set to, for example, a value at which the pulse width of the second activation pulse is about one second or more.

Power supply device 100 shown in FIG. 1 reactivates detection circuit 21 and microcomputer 22 of battery connection circuit 2 in the low power consumption mode by the following operation.

In the low power consumption mode, while not being used for a long time, both detection circuit 21 and microcomputer 22 of battery connection circuit 2 are switched to the low power consumption mode to reduce the power consumption. Microcomputer 22 may be preferably shut down to reduce the power consumption. In this state, activation switch 4 is turned off, input transistor 51 is turned on, and inverting FET 7, first FET 8, and second FET 9 are all turned off to reduce the power consumption.

When activation switch 4 is pressed, input transistor 51 is turned off, inverting FET 7 is turned on, and first FET 8 and second FET 9 are switched to be turned on. First switching circuit 6A switched to be turned on instantaneously outputs the first activation pulse of a high voltage to detection circuit 21, and second switching circuit 6B outputs the second activation pulse to microcomputer 22. Detection circuit 21 to which the first activation pulse is input is activated to supply operation power from microcomputer power supply 23 to microcomputer 22 and supply operation power from low voltage power supply 24 to second FET 9. Microcomputer 22 receiving the operation power starts preprocessing, but does not reach a state where the second activation pulse input to second input terminal 26 can be detected, and starts the polling state after a predetermined time has elapsed. Second switching circuit 6B outputs the second activation pulse having a long pulse width to microcomputer 22. Since the second activation pulse is input to microcomputer 22 even in the polling state of microcomputer 22, microcomputer 22 recognizes the second activation pulse, reactivates from the low power consumption mode, and starts a normal operation mode.

Industrial Applicability

A power supply device according to the present invention is effectively appliable to a device that is in the low power consumption mode in an unused state to reduce power consumption and is reactivated by pressing an activation switch in a used state.

REFERENCE MARKS IN THE DRAWINGS

100 power supply device
1 battery cell
2 battery connection circuit
3 activation circuit
4 activation switch
5 input circuit
6 output circuit
6A first switching circuit
6B second switching circuit
7 inverting FET
8 first FET
9 second FET
10 battery module
12 second load resistor
13 coupling capacitor
14 gate resistor
15 coupling resistor
16 third load resistor
18 power supply line
19 ground line
21 detection circuit
22 microcomputer
23 microcomputer power supply
24 low voltage power supply
25 first input terminal
26 second input terminal
31 capacitor
32 resistor
33 diode
51 input transistor
52 base resistor
53 first load resistor
56 input FET
57 gate resistor

The invention claimed is:

1. A power supply device comprising:

a battery module including chargeable battery cells;

a battery connection circuit connected to the battery module, the battery connection circuit being configured to detect battery information, the battery connection circuit being switchable to a low power consumption mode;

an activation circuit configured to output an activation pulse switching the battery connection circuit from the low power consumption mode to an operation mode; and an activation switch configured to output a switching signal to the activation circuit, wherein the battery connection circuit includes:

a detection circuit configured to detect the battery information of the battery module; and a microcomputer configured to process the battery information detected by the detection circuit, and the activation circuit includes:

a first switching circuit configured to output a first activation pulse to the detection circuit in response to the switching signal input from the activation switch; and a second switching circuit configured to output a second activation pulse having a larger pulse width than the first activation pulse to the microcomputer in response to the switching signal input from the activation switch.

2. The power supply device according to claim 1, wherein the detection circuit includes a first input terminal configured to have the first activation pulse input thereto, the microcomputer includes a second input terminal configured to have the second activation pulse input thereto, the detection circuit is configured to supply a power supply voltage to the microcomputer to set the microcomputer to a polling state upon detecting the first activation pulse, and the microcomputer in the polling state is configured to detect the second activation pulse and determine switching from the low power consumption mode to the operation mode.

3. The power supply device according to claim 1, wherein the activation circuit includes:

an input circuit configured to output a High signal while the activation switch is turned on; and an output circuit connected to an output side of the input circuit, and the output circuit includes:

a first switching circuit configured to output the first activation pulse; and a second switching circuit configured to output the second activation pulse.

4. The power supply device according to claim 3, wherein the detection circuit includes a first input terminal configured to have the first activation pulse input thereto, the microcomputer includes a second input terminal configured to have the second activation pulse input thereto, the first switching circuit includes a first FET configured to output the High signal from the input circuit to the first input terminal of the detection circuit, the second switching circuit includes a second FET configured to output the High signal from the input circuit to the second input terminal of the microcomputer, and a parallel circuit of a capacitor and a resistor is connected between a ground line and an output side of the second FET.

5. The power supply device according to claim 4, wherein the first switching circuit includes a first FET configured to output the High signal from the input circuit to the first input terminal of the detection circuit, the second switching circuit includes a second FET configured to output the High signal from the input circuit to the second input terminal of the microcomputer, the first FET is configured to be powered by a voltage of the battery module, and the first FET includes a coupling capacitor connected in series with a gate of the first FET.

6. The power supply device according to claim 5, further comprising a diode connected in series to a gate of the second FET.

7. The power supply device according to claim 5, wherein the detection circuit includes a low voltage power supply configured to step down the voltage of the battery module and supply a power supply voltage to the second FET.

8. The power supply device according to claim 7, wherein the detection circuit is configured to, upon detecting the first activation pulse, set the low voltage power supply to the operation mode and supply the power supply voltage to the second FET.

9. The power supply device according to claim 7, wherein an output voltage of the battery module is 30 V or more, and an output voltage of the low voltage power supply is 5 V or less.

10. The power supply device according to claim 5, wherein the detection circuit includes a microcomputer power supply configured to step down a voltage of the battery module and supply a power supply voltage to the microcomputer.

11. The power supply device according to claim 10, wherein the detection circuit is configured to, upon detecting the first activation pulse, set the microcomputer power supply to the operation mode, and supply the power supply voltage to the microcomputer.

12. The power supply device according to claim 10, wherein the detection circuit includes a low voltage power supply configured to step down the voltage of the battery module and supply a power supply voltage to the second FET, and the microcomputer power supply together with the low voltage power supply is configured to supply the power supply voltage to the microcomputer and the second FET.

13. The power supply device according to claim 12, wherein an output voltage of the battery module is 30 V or more, and an output voltage of the low voltage power supply is 5 V or less.

14. The power supply device according to claim 10, wherein an output voltage of the battery module is 30 V or more, and an output voltage of the microcomputer power supply is 5 V or less.

15. The power supply device according to claim 1, wherein the detection circuit includes a microcomputer power supply configured to step down a voltage of the battery module and supply a power supply voltage to the microcomputer.

16. The power supply device according to claim 15, wherein the detection circuit is configured to, upon detecting the first activation pulse, set the microcomputer power supply to the operation mode, and supply the power supply voltage to the microcomputer.

17. The power supply device according to claim 15, wherein an output voltage of the battery module is 30 V or more, and an output voltage of the microcomputer power supply is 5 V or less.

18. The power supply device according to claim 1, wherein the activation switch is a push-button switch configured to output an on signal upon being pressed.

* * * * *